(12) United States Patent
Willner et al.

(10) Patent No.: US 12,665,694 B2
(45) Date of Patent: Jun. 23, 2026

(54) MULTIPLEXED TRANSMISSION BY OPTICAL BEAM TRANSFORMATION

(71) Applicant: University of Southern California, Los Angeles, CA (US)

(72) Inventors: Alan Willner, Los Angeles, CA (US); Amir Minoofar, Los Angeles, CA (US); Xinzhou Su, Los Angeles, CA (US); Zhe Zhao, Los Angeles, CA (US); Huibin Zhou, Los Angeles, CA (US); Runzhou Zhang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 260 days.

(21) Appl. No.: 18/688,613

(22) PCT Filed: Sep. 13, 2022

(86) PCT No.: PCT/US2022/043366
§ 371 (c)(1),
(2) Date: Mar. 1, 2024

(87) PCT Pub. No.: WO2023/043738
PCT Pub. Date: Mar. 23, 2023

(65) Prior Publication Data
US 2024/0388362 A1        Nov. 21, 2024

Related U.S. Application Data

(60) Provisional application No. 63/244,102, filed on Sep. 14, 2021.

(51) Int. Cl.
*H04J 14/04*        (2006.01)
*H04B 10/112*        (2013.01)
*H04J 14/00*        (2006.01)

(52) U.S. Cl.
CPC ............ *H04J 14/04* (2013.01); *H04B 10/112* (2013.01); *H04B 10/1121* (2013.01); *H04J 14/07* (2023.08)

(58) Field of Classification Search
CPC ......... H04J 14/04; H04J 14/07; H04B 10/112; H04B 10/50; H04B 10/503; H04B 10/506
(Continued)

(56) References Cited

U.S. PATENT DOCUMENTS

2011/0026935 A1*    2/2011    Akiyama ........... H04B 10/5053
                                                                            398/184
2017/0294966 A1    10/2017    Jia et al.
(Continued)

OTHER PUBLICATIONS

International Search Report & Written Opinion on International Patent Application No. PCT/US2022/043366 dated Dec. 29, 2022 (14 pages).

*Primary Examiner* — Kenneth N Vanderpuye
*Assistant Examiner* — Paul Morgan Brock
(74) *Attorney, Agent, or Firm* — Foley & Lardner LLP

(57)        ABSTRACT

Aspects of this technical solution are directed to multiplexed transmission by optical beam transmission. A method can include generating a first beam having a first frequency in an optical frequency range, generating a second beam including data and having a second frequency in the optical frequency range, converting the first beam and the second beam into a third beam including the data and having a third frequency based on a difference between the first frequency and the second frequency, and transforming the third beam into a fourth beam having a first angular distribution and including a first portion of the data, and into a fifth beam having a second angular distribution corresponding to the first angular distribution and including a second portion of the data.

20 Claims, 10 Drawing Sheets

100

(58) Field of Classification Search
USPC .......................................... 398/43, 182, 188
See application file for complete search history.

(56) References Cited

U.S. PATENT DOCUMENTS

2019/0109666 A1    4/2019   Kato et al.
2020/0127757 A1    4/2020   Matsuda et al.

* cited by examiner

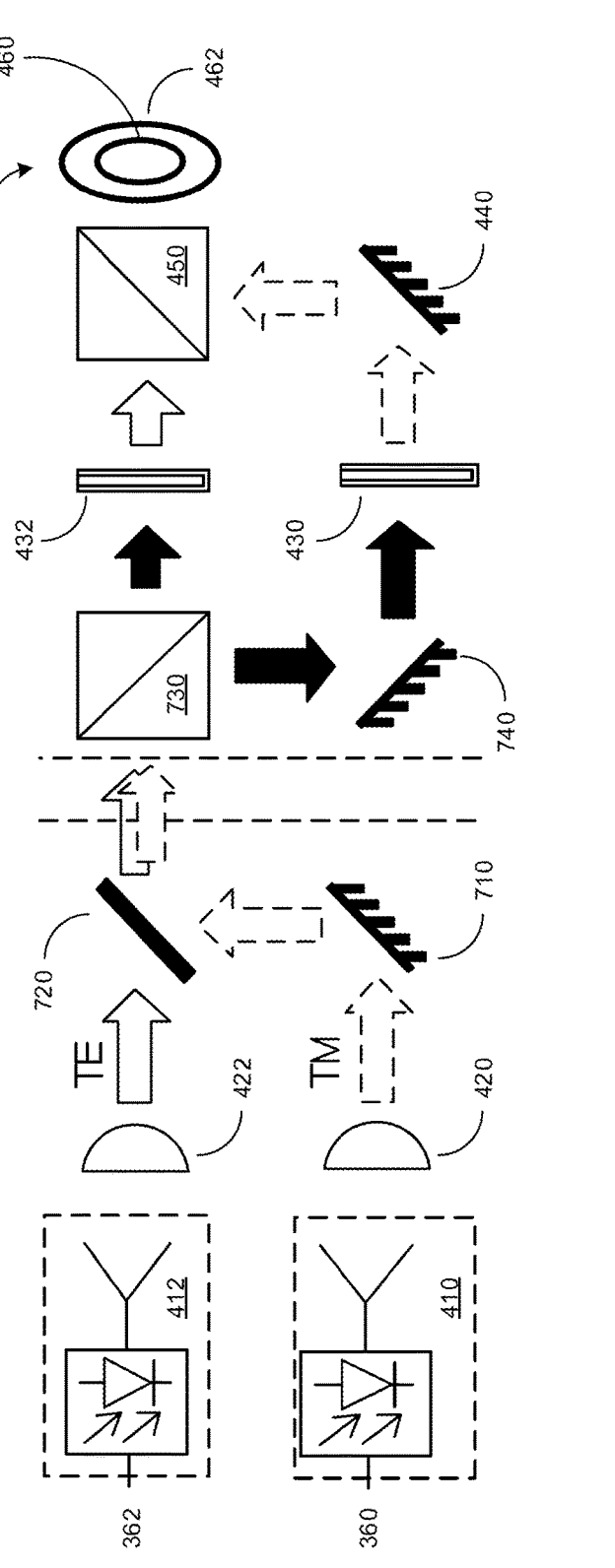
Fig. 7

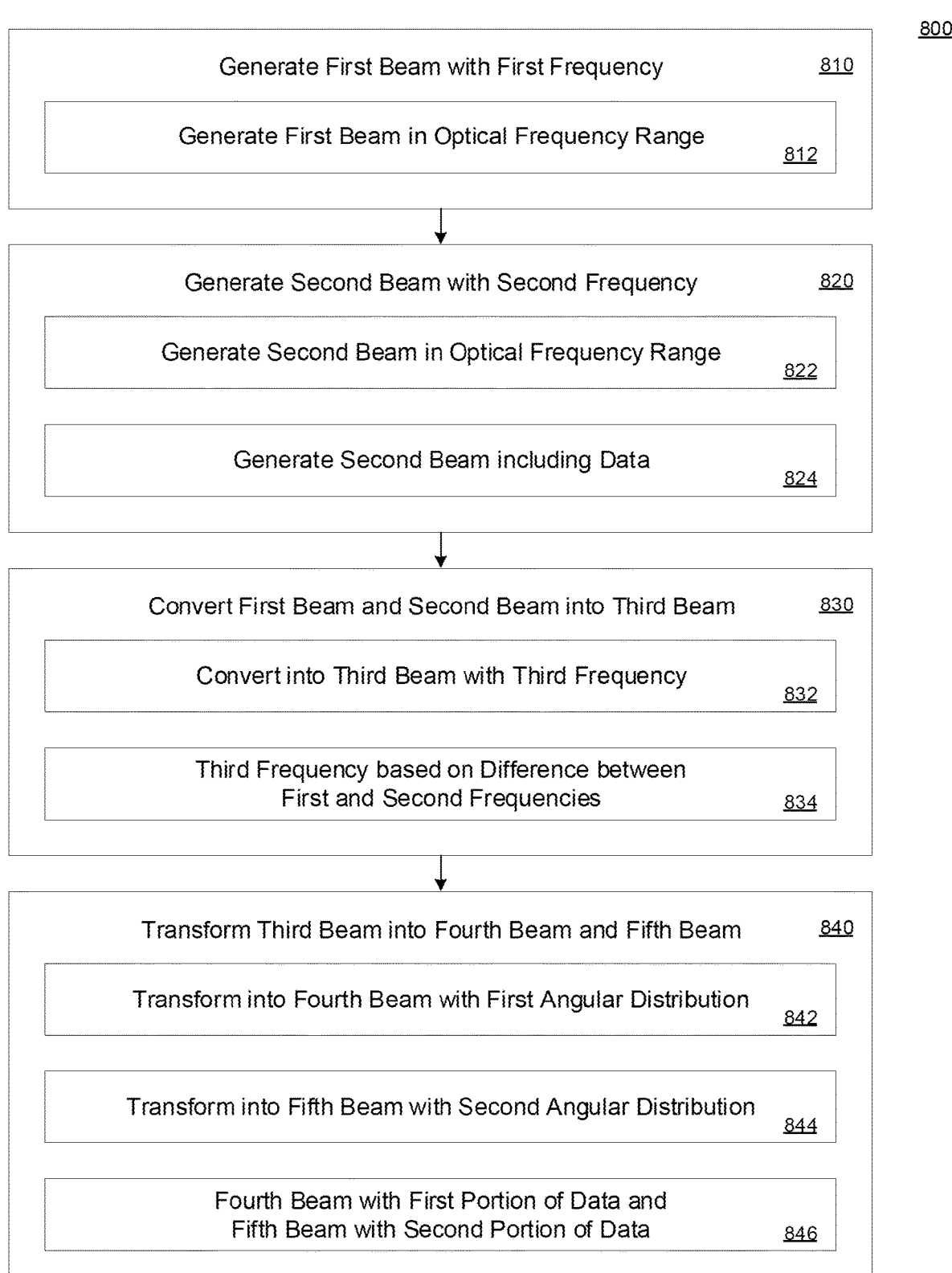

800

Generate First Beam with First Frequency          810

Generate First Beam in Optical Frequency Range

812

Generate Second Beam with Second Frequency          820

Generate Second Beam in Optical Frequency Range

822

Generate Second Beam including Data

824

Convert First Beam and Second Beam into Third Beam          830

Convert into Third Beam with Third Frequency

832

Third Frequency based on Difference between
First and Second Frequencies          834

Transform Third Beam into Fourth Beam and Fifth Beam          840

Transform into Fourth Beam with First Angular Distribution

842

Transform into Fifth Beam with Second Angular Distribution

844

Fourth Beam with First Portion of Data and
Fifth Beam with Second Portion of Data          846

MULTIPLEXED TRANSMISSION BY OPTICAL BEAM TRANSFORMATION

CROSS-REFERENCE TO RELATED PATENT APPLICATIONS

This application is a National Stage Entry under 35 U.S.C. § 371 of International Application No. PCT/US2022/043366, filed Sep. 13, 2022, which application claims the benefit of priority under 35 U.S.C. § 119 to U.S. Provisional Patent Application Ser. No. 63/244,102, entitled "TERA-HERTZ ORBITAL ANGULAR MOMENTUM (OAM)-MULTIPLEXED COMMUNICATIONS SYSTEMS," filed Sep. 14, 2021, the contents of all such applications being hereby incorporated by reference in their entireties and for all purposes as if completely and fully set forth herein.

STATEMENT REGARDING FEDERALLY SPONSORED RESEARCH OR DEVELOPMENT

This invention was made with government support under Grant Number DSCA 4440646262, awarded by the Defense Security Cooperation Agency ("DSCA"); under Grant Number ECCS-1509965, awarded by the National Science Foundation ("NSF"); and under Grant Number N00014-16-1-2813, awarded by the Office of Naval Research ("ONR"). The government has certain rights in the invention.

TECHNICAL FIELD

The present implementations relate generally to telecommunication systems, and more particularly to multiplexed transmission by optical beam transmission.

INTRODUCTION

Telecommunications are increasingly expected to transmit larger quantities of data at higher speeds while maintaining and increasing reliability of transmission. Wireless transmission by diverse spectra is increasingly desired to provide communication in multiple ambient physical and environmental conditions.

SUMMARY

Aspects of this technical solution are directed to generating an optical wireless signal having capacity to carry multiple data channels. This technical solution can transmit an optical signal supporting multiple data channels to provide a high speed wireless communication of tens of gigabits per second (Gbit/s) or greater. For example, this technical solution can transmit an optical signal at a rate of 32 Gbit/s and can support 8 data channels or more. This technical solution can generate an optical beam having a coaxial or ring distribution in a cross section, and can multiplex the optical beam. The technique of multiplexing multiple data-carrying beams can increase total channel capacity and spectral efficiency in wireless communication links. One example of the technique is mode-division-multiplexing (MDM), where multiple data-carrying beams are multiplexed at the transmitter aperture, co-axial propagating through free space, and efficiently demultiplexed at the receiver aperture. Since each beam is chosen as one unique mode from an orthogonal modal basis set, this technical solution can efficiently multiplex multiple beams at the transmitter (Tx), coaxially propagated, and demultiplexed at the receiver (Rx) with little inherent crosstalk (XT). Thus, a technological solution for multiplexed transmission by optical beam transmission is provided.

An aspect of this technical solution is directed to a system of transmission supporting multiplexed communication by optical beam transformation. The system can include a first beam generator to generate a first beam having a first frequency in an optical frequency range. The system can include a second beam generator to generate a second beam having a second frequency in the optical frequency range. The system can include a beam modulator operatively coupled with the second beam generator to modulate the second beam to include data. The system can include an optical fiber operatively coupled with the first beam generator and the beam modulator to convert the first beam and the second beam into a third beam including the data and having a third frequency based on a difference between the first frequency and the second frequency. The system can include a phase transformer operatively coupled with the photodiode to transform the third beam into a fourth beam having a first angular distribution and including a first portion of the data, and into a fifth beam having a second angular distribution corresponding to the first angular distribution and including a second portion of the data.

An aspect of this technical solution is directed to a method of transmission supporting multiplexed communication by optical beam transformation. The method can include generating a first beam can have a first frequency in an optical frequency range. The method can include generating a second beam can include data and can have a second frequency in the optical frequency range. The method can include converting the first beam and the second beam into a third beam can include the data and can have a third frequency based on a difference between the first frequency and the second frequency. The method can include transforming the third beam into a fourth beam can have a first angular distribution and can include a first portion of the data, and into a fifth beam can have a second angular distribution corresponding to the first angular distribution and can include a second portion of the data.

An aspect of this technical solution is directed to a system of transmission supporting multiplexed communication by optical beam transformation. The system can include a phase transformer to receive a first beam in an optical frequency range can have a first angular distribution and can include a first portion of data, and a second beam in the optical frequency range can have a second angular distribution corresponding to the first angular distribution and can include a second portion of the data. The system can include an optical signal converter to transform the first beam and the second beam into a third beam in the optical frequency range can include the first portion and the second portion of the data. The system can include a digital signal processor to generate, based on the third beam, a first electrical signal can include the first portion and the second portion of the data.

An aspect of this technical solution is directed to a method of transmission supporting multiplexed communication by optical beam transformation. The method can include receiving a first beam in an optical frequency range can have a first angular distribution and can include a first portion of data, and a second beam in the optical frequency range can have a second angular distribution corresponding to the first angular distribution and can include a second portion of the data. The method can include transforming the first beam and the second beam into a third beam in the optical frequency range can include the first portion and the second portion of the data. The method can include generating, based on the third beam, a first electrical signal can include the first portion and the second portion of the data.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 7 illustrates a transmitter circuit with multiple polarizers, in accordance with present implementations.

FIG. 8 illustrates a method of transmitting a multiplexed communication by optical beam transformation, in accordance with present implementations.

DETAILED DESCRIPTION

Figure 1:
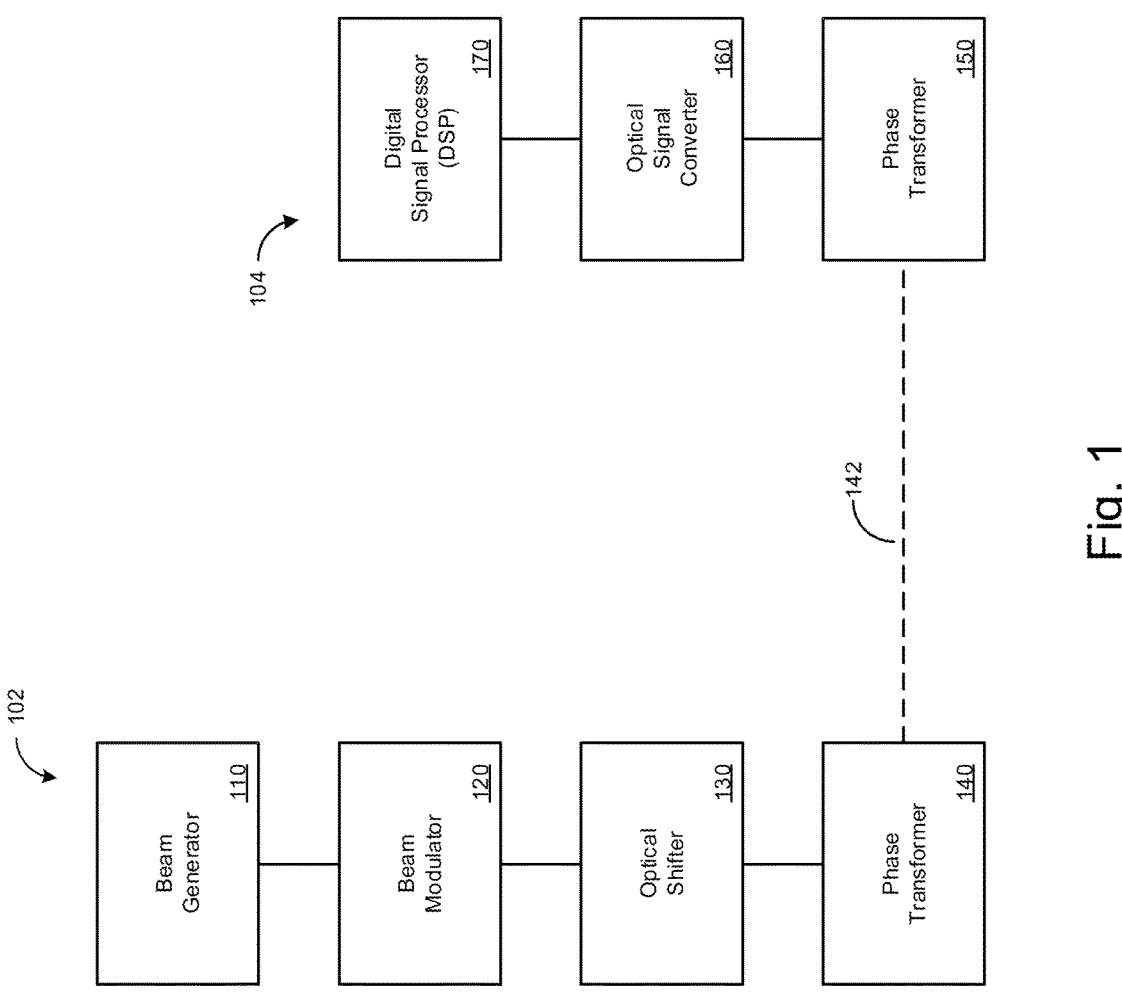
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Optical transmission in accordance with this technical solution in the 0.1-1 THz carrier-frequency range can increase available bandwidth for communication systems. System and devices for transmitting and receiving beams for this frequency range will often utilize optical elements to provide stable and tunable sources. For example, mixing two lasers spaced within THz frequencies in a photodiode can produce highly stable THz sources, and the ability to finely tune the laser frequencies gives the ability to widely tune the location of the data channels.

Further, data capacity of THz systems can be increased by multiplexing and simultaneously transmitting multiple independent data channels. For example, both frequency-division-multiplexing (FDM) and polarization-division-multiplexing (PDM) can increase the data rate by transmitting multiple data channels on different carrier frequencies and/or on two different orthogonal polarizations. This can result in higher bit rate transmission per second, and can provide a technical improvement of at least achieving transmission speed in the tens of Gbit/s or greater. Additionally, space-division-multiplexing (SDM) can be used as a multiplexing domain, and SDM can complement and be compatible with FDM and PDM. Specifically, a subset of SDM is mode-division-multiplexing (MDM), in which each data channel is carried by a different beam having an orthogonal spatial mode.

For example, one type of modal set is orbital-angular momentum (OAM), which can be considered as a subset of the Laguerre Gaussian (LG) modes. A beam that carries OAM can include a phase front that "twists" in the azimuthal direction as it propagates, a number of $2\pi$ phase shifts in the azimuthal direction corresponding to or equal to an OAM mode order $\ell$, and an intensity profile that has a ring-like doughnut profile or cross section. OAM-based communication systems can perform at least in the optical and millimeter-wave domains. Capabilities of OAM beams in the THz regime can, for example, include generating and detecting OAM beams, encoding bits of information on different OAM values, and multiplexing two OAM-based 4-Gbit/s quadrature-phase-shift-keyed (QPSK) data channels in the 0.3-THz region. However, there has been little reported on combining OAM multiplexing (i.e., MDM) together with FDM or PDM for high-capacity, free-space THz links.

This technical solution can provide a technical improvement of THz communication systems with increased data capacity via the technical solution of multiplexing and simultaneously transmitting multiple independent data channels. One example approach is to utilize frequency-division-multiplexing (FDM), such that each data channel is located at a different THz frequency. One example approach is space-division-multiplexing (SDM).

This technical solution can include, for example, an 8-Gbit/s quadrature-phase-shift-keyed (QPSK) communications using two multiplexed OAM beams in the 0.27-0.33 THz range. A THz data channel can be generated by mixing two lasers in a positive-intrinsic-negative photodiode (PIN-PD) based THz emitter, with one of the lasers modulated with a data signal. Two PIN-PDs and two different spiral phase plates (SPPs) can be used to generate two THz-OAM beams. For example, by multiplexing two OAM beams (OAM +1/−2), an 8-Gbit/s data rate can be achieved in a 0.2-m THz wireless link with each channel carrying a 2-Gbaud QPSK signal. The power characteristic compared with a single THz-Gaussian channel is ~2 dB and ~4 dB for OAM +1 and −2, respectively. By tuning frequency spacing between two lasers to satisfy a particular threshold, this technical solution can achieve a technical improvement of a frequency-tunable OAM multiplexed THz link with a frequency range of 0.27-0.33 THz.

FIG. 1 illustrates a system in accordance with present implementations. As illustrated by way of example in FIG. 1, an example system 100 can include a transmitter system 102 and a receiver system 104. The transmitter system 102 can include a beam generator 110, a beam modulator 120, an optical shifter 130, and a phase transformer 140. The receiver system 104 can include a phase transformer 150, an optical signal converter 160, and a digital signal processor (DSP) 170. The transmitter system 102 can transmit optical waveform 142 to the receiver system 104.

The beam generator 110 can generate one or more optical beams. One or more of the optical beams can include data. For example, an optical beam can include a laser beam or coherent light beam in any spectrum. The beam generator 110 can generate optical beams in an optical frequency range corresponding to a particular frequency or wavelength or range thereof. The optical frequency range can include one or more frequencies corresponding to one or more of visible light, ultraviolet energy, and infrared energy. For example, the beam generator 110 can generate a laser in the visible light spectrum, the ultraviolet light spectrum, or the infrared alight spectrum. The beam generator 110 can generate multiple optical beams each in corresponding or different optical frequency ranges. For example, the beam generator 110 can generate a first beam in a visible light frequency and a second beam in an infrared frequency. The beam generator 110 can generate multiple optical beams by one or more laser diodes, for example.

The beam modulator 120 can modify an optical beam generated by the beam generator 110. For example, the beam modulator can modulate one or more of a frequency, wavelength, power, luminosity, or any combination thereof, of an optical beam generated by the beam generator 110. The beam modulator 120 can modify an optical beam to encode data into the optical beam. For example, the beam modulator 120 can modulate a power output of an optical beam over time to encode a binary data stream into the optical beam. For example, a particular first power level of an optical beam can correspond to a binary 'on' state, and a particular second power level of the optical beam distinct from the first power level can correspond to a binary 'off' state.

The second frequency can satisfy a predetermined frequency threshold corresponding to the first frequency. The difference between the first frequency and the second frequency can satisfy a predetermined frequency threshold. For example, the beam generator 110 and the beam modulator 120 can generate OAM beams with the technical improvement of minimal crosstalk between two channels. A frequency difference $\Delta f$ between frequencies of a first beam and a second beam generated by the beam generator 110 can equal, for example, 0.3 THz. For an example OAM +1 and OAM −2, the maximum relative power of received undesired modes is −10 dB and −9 dB, respectively. Channel crosstalk between the two OAM channels is, for example, −14 dB. A bit-error-rate (BER) performance of the OAM multiplexed link by beam modulation can be advantageously decreased. For example, two multiplexed channels (Muxed OAM +1 and Muxed OAM −2) can reach a forward error correction (FEC) limit.

The beam generator 110 can generate multiple optical beams with a frequency difference $\Delta f$ between two optical beams to generate different THz frequencies. Wavelengths of a first optical beam can be between 1548 nm and 1550 nm, and wavelengths of a second optical beam can be between 1551 nm and 115 nm. The system 100 can generate beams with frequency differences $\Delta f$ between 0.27 THz and 0.33 THz. For example, the maximum relative power of received undesired modes with 0.27 THz and 0.33 THz is −8 dB and −5 dB, respectively. The constellations and BER of the OAM multiplexed THz link (1-Gbaud QPSK per channel) for different THz frequencies indicate a frequency-tunable OAM multiplexed THz link with a 60-GHz frequency range enabled by the photonic-assisted THz wave generation. Thus, the system 100 can provide a technical improvement of high bandwidth The optical shifter 130 can delay a particular optical beam to decorrelate two optical beams. For example, decorrelating an optical beam can include delaying the optical beam by a predetermined amount with respect to another optical beam. For example, the optical shifter 130 can transmit a first optical beam through an optical fiber of a first length and transmitting a second optical beam through an optical fiber of a second length longer than the first length to introduce a delay. The optical fiber can include a first fiber channel having a first length to transmit a portion of the third beam corresponding to the first beam at a first delay. The optical fiber can include a second fiber channel having a second length to transmit a portion of the third beam corresponding to the second beam at a second delay greater than the first delay. The system can include a photodiode operatively coupled with the optical fiber to convert the first beam and the second beam into the third beam.

The phase transformer 140 can generate one or more OAM beams based on one or more optical beams received from the beam modulator 120. The phase transformer can include a first spiral phase plate to transform the third beam into the fourth beam. The phase transformer can include a second spiral phase plate to transform the third beam into the fifth beam. A spiral phase plate can include, for example, a mechanical structure to convert an optical beam into a beam having an angular distribution with a circular or substantially circular cross section. For example, a circular or substantially circular cross section can correspond to a distribution of photons along a circumference of a circle and absent or minimally present at a center or within an area of a circle. The spiral phase plate can have a particular structure to generate a particular geometric distribution of photons of a beam, with respect to, for example, a particular diameter of a circular cross section for example. The phase transformer 140 can align the fourth beam and the fifth beam concentrically based on a first center of the first circular cross-section and a second center of the second circular cross section. For example, the phase transformer 140 can include a plurality of spiral phase plates to generate a plurality of beams with circular cross sections. Each beam can be aligned coaxially based on a center of the cross sectional distributions and in an axis corresponding to the direction of projection of the corresponding optical beam. The system 100 can include a transmitter operatively coupled with the phase transformer to transmit the aligned fourth beam and the fifth beam.

For example, the phase transformer 140 can generate a THz-Gaussian data channel by mixing two lasers in a photodiode (PD), with one of the lasers modulated with the data channel. The generated THz frequency $\Delta f$ can correspond to the frequency spacing between the two lasers. Data carrying THz-OAM beams can be generated by propagating the THz-Gaussian beam through SPPs (l1 or l2). Subsequently, two different THz-OAM beams, which carry data Ch1 and data Ch2, are combined and propagate simultaneously.

The optical waveform 142 can include a plurality of optical beams each having a circular cross section. For example, the optical waveform 142 can include a first beam having a first circular cross section at a first radius and centered on a particular point, and can include a second beam having a second circular cross section greater than the first circular cross section and centered on the same particular point. The optical waveform 142 can transmit data in accordance with one or more data channels. For example, a particular data channel can be divided among multiple beams of the optical waveform 142. For example, multiple data channels can be multiplexed in the optical waveform 142. The fourth beam can include the first portion of the data corresponding to a first channel of the data, and the fifth beam can include the second portion of the data corresponding to a second channel of the data. The first angular distribution can have a first circular cross section, and the second angular distribution can have a second circular cross section corresponding to the first circular cross section.

The phase transformer 150 can receive one or more OAM beams and can convert those OAM beams into received optical beams having a beam distribution in a cross section corresponding to those generated by the beam generator 110. The system 100 can include the phase transformer to receive the first beam and the second beam aligned concentrically based on a first center of the first circular cross-section and a second center of the second circular cross section. The optical frequency range can include one or more frequencies corresponding to one or more of visible light, ultraviolet energy, and infrared energy. For example, the phase transformer 150 can obtain the optical waveform 142 in visible light frequencies, ultraviolet light frequencies, or infrared light frequencies corresponding to the frequency range of optical beams generated by the beam generator 110. The first beam can have a first frequency in the optical frequency range can satisfy a predetermined frequency threshold corresponding to a second frequency in the optical frequency range of the second beam. The difference between the first frequency and the second frequency can satisfy a predetermined frequency threshold. The first angular distribution can have a first circular cross section, and the second angular distribution can have a second circular cross section corresponding to the first circular cross section. The frequency difference Δf of the OAM beams of the optical waveform 142 received at the phase transformer 150 can remain equal to the frequency difference Δf of the OAM beams of the optical waveform 142 transmitted by the phase transformer 140.

The optical signal converter 160 can convert one or more OAM beams into one or more optical beams corresponding to beams generated by the beam generator 110. The first beam can include the first portion of the data corresponding to a first channel of the data, and the second beam can include the second portion of the data corresponding to a second channel of the data. For example, the phase transformer 150 can reconstruct the data encoded into one of the beams generated by the beam generator 110, by combination data from each of the coaxially aligned OAM beams of the optical waveform 142. The optical signal converter can include a first spiral phase plate to transform the first beam and the second beam into the third beam.

The DSP 170 can perform one or more analog and digital signal processing processes on received optical beams to transform data encoded in the received optical beam into one or more digital or analog electrical signals corresponding to the data encoded in the received optical beam.

Figure 2:
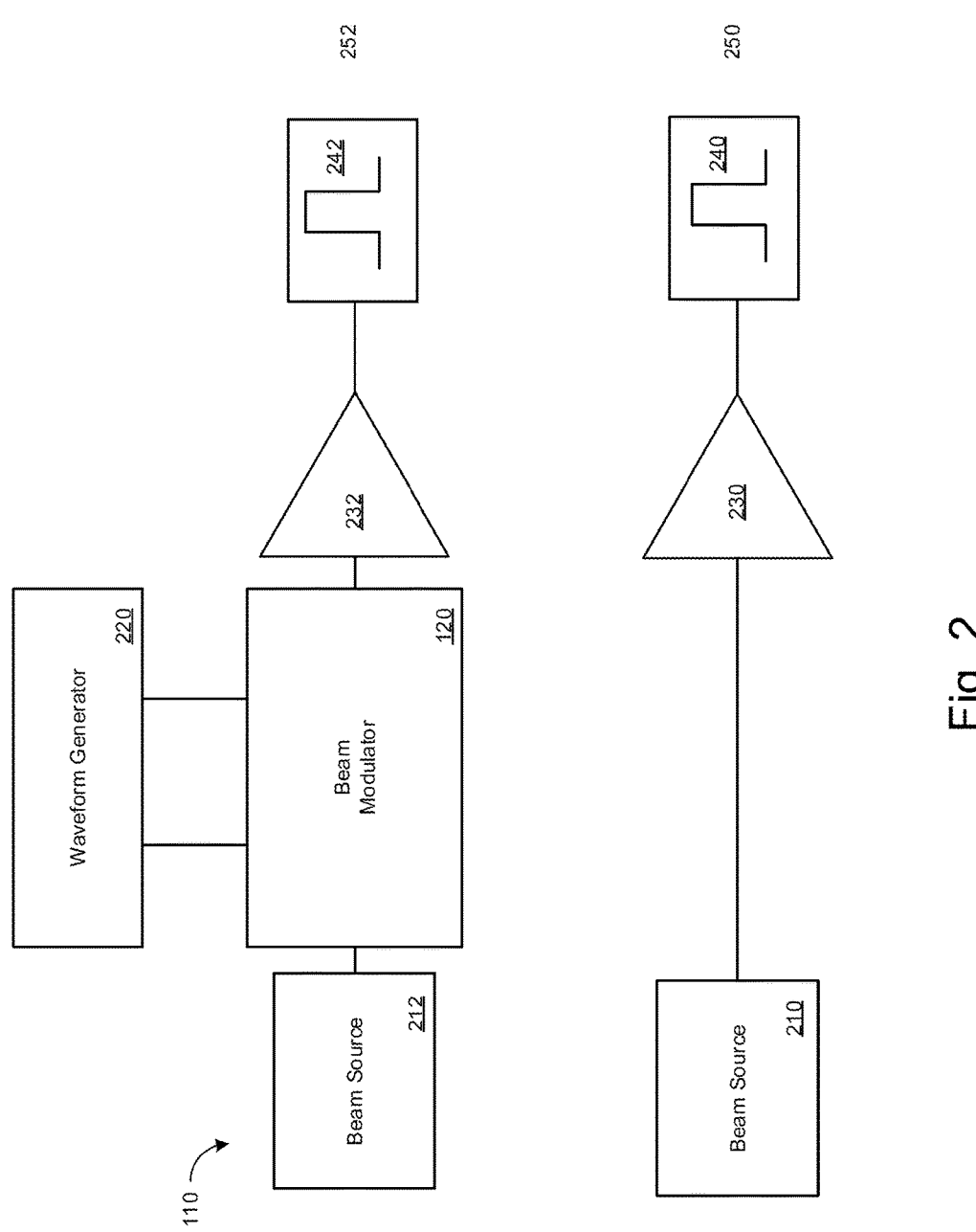
FIG. 2 illustrates a beam circuit in accordance with present implementations.

FIG. 2 illustrates a beam circuit in accordance with present implementations. As illustrated by way of example in FIG. 2, an example beam circuit 200 can include the beam modulator 120, a first beam source 210, a second beam source 212, a waveform generator 220, a first beam amplifier 230, a second beam amplifier 232, a first filter 240, and a second filter 242.

The first beam source 210 can generate a first optical beam. The first beam source 210 can, for example, generate a laser having a particular frequency. The second beam source 212 can generate a second optical beam. The second beam source 212 can, for example, generate a laser having a particular frequency having a frequency difference Δf with respect to the particular frequency of the first optical beam. The first beam source 210 and the second beam source 212 can each include, for example, one or more photodiodes, chemical reaction chambers, or any combination thereof, to generate light in a particular frequency range.

The waveform generator 220 can generate an analog signal corresponding to a data stream. For example, the waveform generator 220 can receive an electrical signal corresponding to a digital bit stream, can generate an analog waveform that encodes the received digital bit stream. For example, the waveform generator 220 can generate an analog waveform restricted to frequencies corresponding to an optical frequency range of the second beam source 212. Thus, the waveform generator 220 can provide a technical improvement of generating an analog waveform compatible with a particular beam source to generate in the THz frequency range. The waveform generator 220 can include a digital-to-analog converter circuit or the like. The waveform generator 220 can provide the analog waveform to the beam modulator 120 as input to the beam modulator 120. The beam modulator 120 can then modulate an optical beam generated by the second beam source 212 based on the analog waveform compatible with the second beam source 212 to encode the digital bit stream into the optical beam generated by the second beam source 212. For example, the frequency difference Δf is tuned from 0.27 THz to 0.33 THz, and the first beam source 212 is modulated by a 2-Gbaud QPSK data signal. This signal stems from a single data generator coupled with or comprising the waveform generator 220, whose output is split, with one path delayed to decorrelate the data channels. For example, the tuning range can be limited by the working frequency range of the THz amplifier and down converter.

The first beam amplifier 230 can amplify the first optical beam, by for example, amplifying a power of the first optical beam. The second beam amplifier 232 can amplify the second optical beam, by for example, amplifying a power of the second optical beam. The first beam amplifier 230 and the second beam amplifier 232 can include an optical amplifier or the like. The first filter 240 can reduce optical interference of the amplified first optical beam by removing or blocking frequencies outside of a predetermined frequency range corresponding to the optical frequency range. The second filter 242 can reduce optical interference of the amplified second optical beam by removing or blocking frequencies outside of a predetermined frequency range corresponding to the optical frequency range. The first filter 240 and the second filter 242 can each respectively include a band pass filter. The first filter 240 and the second filter 242 can respectively generate optical beams 250 and 252 as output.

Figure 3:
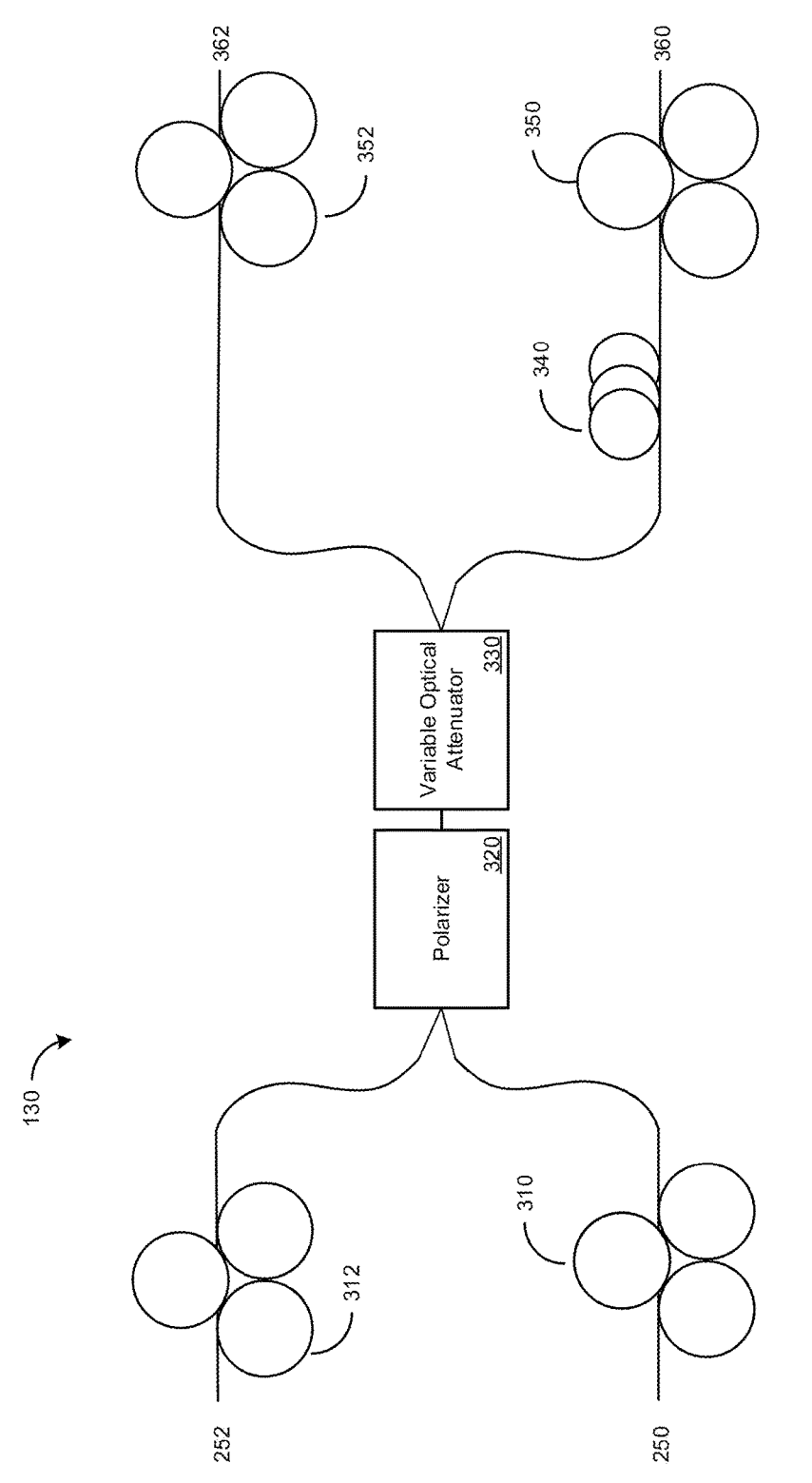
FIG. 3 illustrates an optical circuit in accordance with present implementations.

FIG. 3 illustrates an optical circuit in accordance with present implementations. As illustrated by way of example in FIG. 3, an example optical circuit 300 can receive the optical beams 250 and 252, and can include optical controllers 310, 312, 350 and 352, an optical delay fiber 340, a polarizer 320, and a variable optical attenuator 330. The optical circuit 300 can receive the optical beams 250 and 252 respectively at the optical controllers 310 and 312. The optical controllers 310 and 312 can include windings to deliver the optical beams 250 and 252 concurrently to the polarizer 320. The polarizer 320 can modify a polarization of one or more of the optical beams 250 and 252 to be compatible with one or more spiral phase plates of the phase transformer 140. A polarization compatible with the spiral phase plate can correspond to a polarization to, for example, maximize propagation of a transmission by the phase transformer 140 through a particular ambient environment. An ambient environment can, for example, include a particular atmospheric turbulence. For example, for each path, two lasers from each of the optical beam sources 210 and 212 can be mixed in a PIN-PD based THz Tx to generate a THz data channel. The variable optical attenuator 330 can modify a power of one or more of the optical beams 250 and 252 to be compatible with one or more spiral phase plates of the phase transformer 140. A power compatible with the spiral phase plate can correspond to a polarization to, for example, maximize propagation of a transmission by the phase transformer 140 through a particular ambient environment. The optical delay fiber 340 can include a length of optical fiber connecting the variable optical attenuator 330 to the optical controller 350 greater than a length of optical fiber connecting the variable optical attenuator 330 to the optical controller 352. The optical delay fiber 340 can decorrelate the optical beams 250 and 252. The optical controllers 350 and 352 can generate optical beams 360 and 362 as output.

Figure 4:
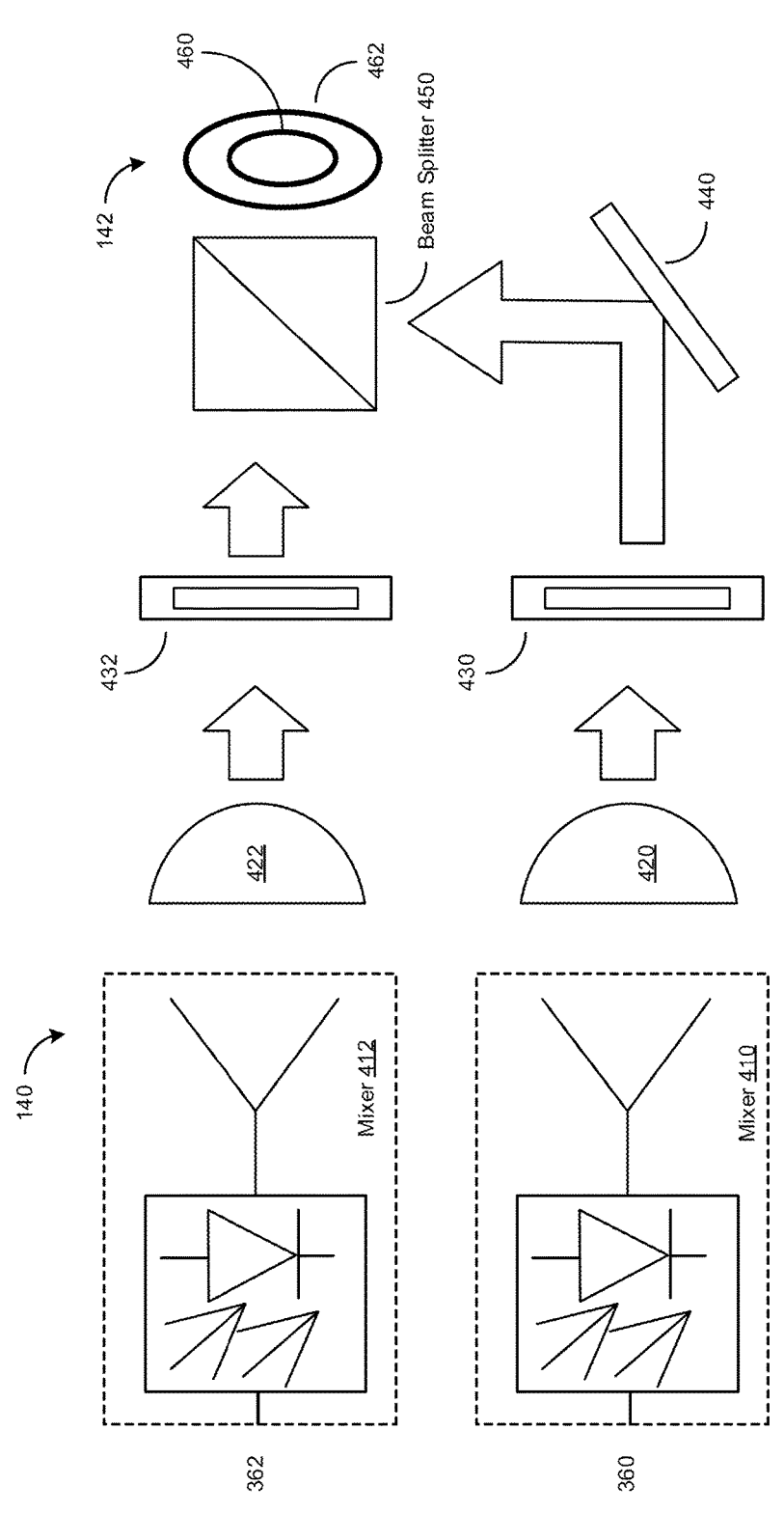
FIG. 4 illustrates a transmitter circuit in accordance with present implementations.

FIG. 4 illustrates a transmitter circuit in accordance with present implementations. As illustrated by way of example in FIG. 4, an example transmitter circuit 400 can correspond to the phase transformer 140 and can include a first mixer 410, a second mixer 412, a first lens 420, a second lens 422, a first spiral phase plate 430, a second spiral phase plate 432, a mirror 440, and a beam splitter 450. The first mixer 410 and the second mixer 412 can respectively receive the optical beams 360 and 362 as input. The beam splitter can generate the optical waveform 142 including a first channel 460 and a second channel 462. For example, the phase transformer 140 can generate a THz-Gaussian data channel by mixing the optical beams 360 and 362 in a photodiode (PD), with one of the optical beams 360 and 362 modulated with the data channel. The generated THz frequency Δf can correspond to the frequency spacing between the optical beams 360 and 362. Data carrying THz-OAM beams 460 and 462 can be generated by propagating the THz-Gaussian beam through the first spiral phase plate 430 and the second spiral phase plate 432. Subsequently, two different THz-OAM beams 460 and 462, which respectively carry a first data channel and a second data channel, are combined and propagate simultaneously or concurrently.

Figure 5:
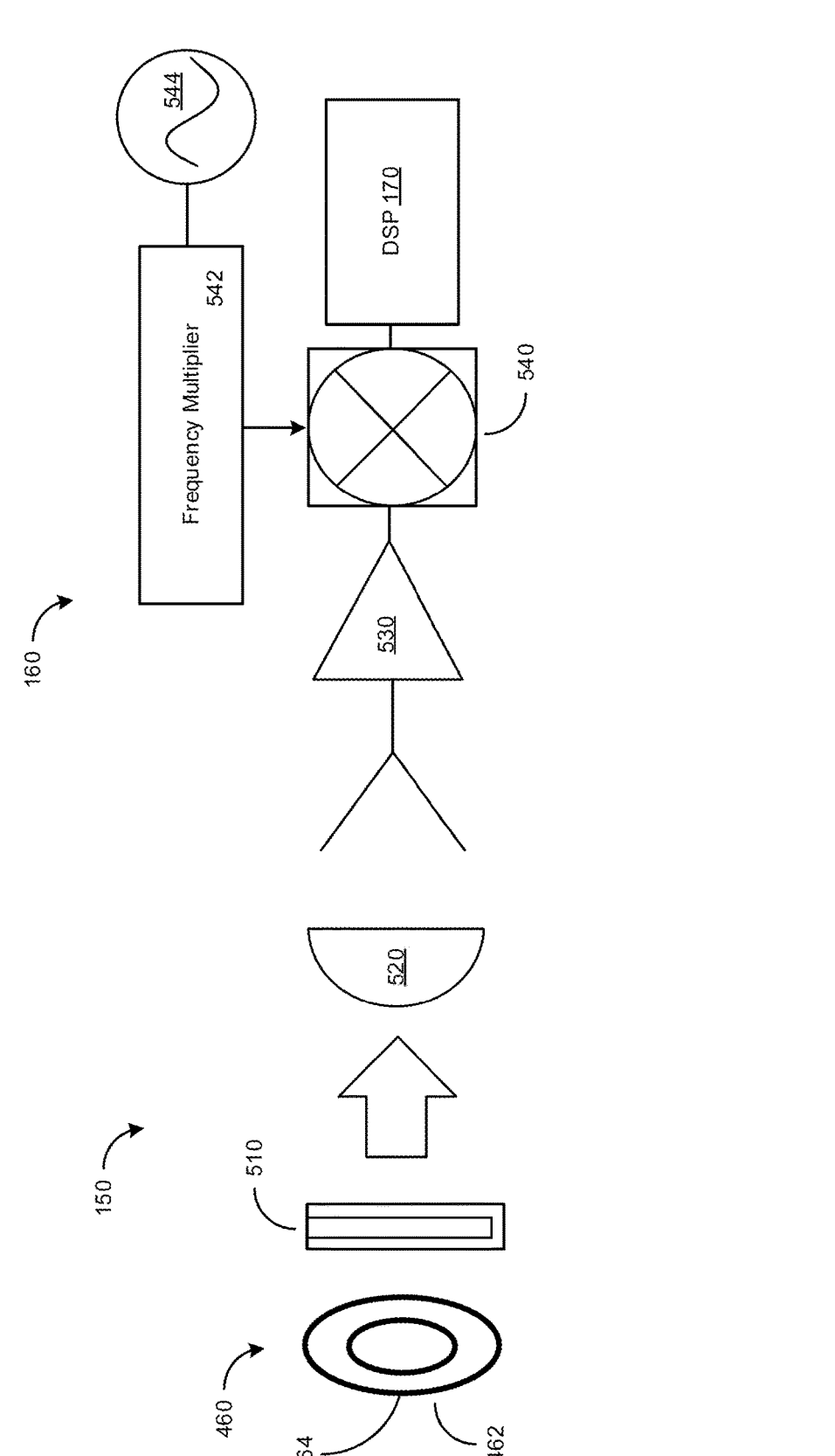
FIG. 5 illustrates a receiver circuit in accordance with present implementations.

FIG. 5 illustrates a receiver circuit in accordance with present implementations. As illustrated by way of example in FIG. 5, an example receiver circuit 500 can include the DSP 170, an inverse spiral phase plate 510, a lens 520, an amplifier 530, a down converter 540, a frequency multiplier 542, and a current source 544. For example, at the receiver circuit 500, the inverse spiral phase plate 510 can receive the optical waveform 142 and convert it back to a THz-Gaussian optical beam which can be received by an antenna at the amplifier 530 which can increase power of the received optical waveform 142. The down-converter 540 can convert the THz data channel to an electrical signal intermedia frequency (IF) band. The DSP 170 can receive the electrical signal and extract the digital bit stream. For example, generation and detection of the OAM modes can be done through 3D-printed spiral phase plates as described herein. For example, the THz down converter is used to convert the THz data channel to 18-GHz IF.

Figure 6:
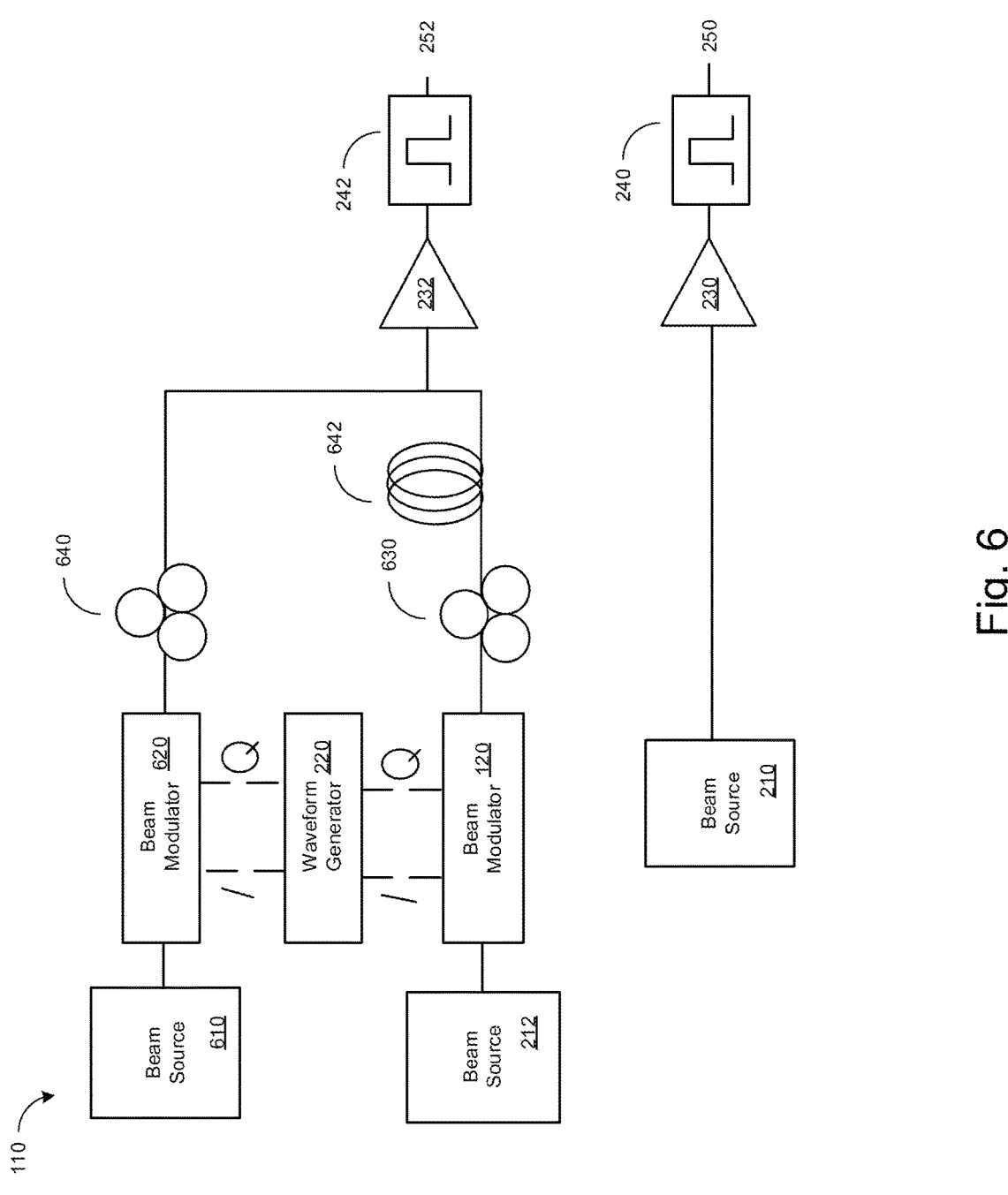
FIG. 6 illustrates a beam circuit including multiple beam modulators, in accordance with present implementations.

FIG. 6 illustrates a beam circuit including multiple beam modulators, in accordance with present implementations. As illustrated by way of example in FIG. 6, an example beam circuit 600 can include the beam modulator 120, the first beam source 210, the second beam source 212, the waveform generator 220, the first beam amplifier 230, the second beam amplifier 232, the first filter 240, the second filter 242, a third beam source 610, a beam modulator 620, a first optical controller 630, a second optical controller 640, and an optical delay fiber 642.

The third beam source 610 can generate a third optical beam. The third beam source 610 can, for example, generate a laser having a particular frequency corresponding to or matching the particular frequency of the first optical beam. The third beam source 610 can include, for example, one or more photodiodes, chemical reaction chambers, or any combination thereof, to generate light in a particular frequency range. The beam modulator 620 can correspond at least partially in one or more of structure and operation to the beam modulator 120. The waveform generator 220 can provide a second analog waveform to the beam modulator 620 as input to the beam modulator 620. The beam modulator 620 can then modulate an optical beam generated by the third beam source 610 based on the second analog waveform compatible with the third beam source 610 to encode a second digital bit stream into the optical beam generated by the third beam source 610. Thus, the dual beam modulator structure of the beam circuit 600 can provide a technical improvement of supporting encoding and transmission of additional data streams and data channels.

The first optical controller 630 and the second optical controller 640 can include windings to synchronize optical beams respectively generated by the beam modulators 120 and 620. The optical delay fiber 642 can include a length of optical fiber connecting the second beam amplifier 232 to the beam modulator 120 greater than a length of optical fiber connecting the second beam amplifier 232 to the beam modulator 620. The optical delay fiber 642 can decorrelate the optical beams output respectively by the optical controllers 630 and 640.

For example, the beam circuit 600 can generate the THz FDM channels by mixing data-carrying lasers generated by the beam sources 212 and 610 and a CW laser generated by the beam source 210, functioning as a local oscillator (LO) with a frequency spacing $\Delta f = f1, f2$. In this case, the generated THz FDM channels (data 1,2 at the PIN-PD output) have the carrier frequencies of $f1$ and $f2$. The FDM channels (TE pol. with data 1,2) are then multiplexed with the other two FDM channels (TM pol. with data 3,4) with orthogonal polarizations in free space. Subsequently, the FDM and PDM channels carried by the one OAM $\ell$ 1 beam are multiplexed with the other group of FDM and PDM channels carried by the OAM beam with a different mode order $\ell$ 2 with little inherent crosstalk. Thus, data capacity can be increased 8-fold by multiplexing these 2 frequencies, 2 polarizations, and 2 OAM modes (data 1-4 on OAM ℓ 1 and data 5-8 on OAM ℓ 2).

The generated OAM beams can be characterized in a single channel using two CW lasers. For example, a number of twists in the interferogram can correspond to the number of $2\pi$ phase changes of OAM modes ℓ . A mode spectrum of OAM +1 and OAM +3 for different polarizations and frequencies by changing the SPP for detection at Rx. For example, power leaked to neighboring modes are −10 dB and −9 dB for OAM +1 and +3, respectively.

Thus, for example, a multiplexed link can have 8 channels (frequency: 0.3 and 0.303 THz, polarization: TE and TM polarization, OAM modes: OAM +1 and +3). Normalized crosstalk between channels with different polarizations, frequencies and OAM modes can then be characterized in the multiplexed link using CW light. For example, received power of OAM +3 channels is ~2-4 dB less than the OAM +1 channels. For example, the channel crosstalk from different polarizations and OAM modes can be less than −14 dB. In addition, power leakage can be less than −30 dB from channels with different frequencies.

FIG. 7 illustrates a transmitter circuit with multiple polarizers, in accordance with present implementations. As illustrated by way of example in FIG. 7, an example transmitter circuit 700 can correspond to the phase transformer 140 and can include the first mixer 410, the second mixer 412, the first lens 420, the second lens 422, the first spiral phase plate 430, the second spiral phase plate 432, the mirror 440, the beam splitter 450, mirrors 710, 720 and 740, and beam splitter 730. The transmitter circuit 700 can receive optical beams generated by the beam circuit 600.

For example, the transmitter circuit 700 can modulate the optical beams 360 and 362 with a 2-Gbaud QPSK data signal, with a frequency offset between the two lasers of 3.5 GHz. One of the optical beams 360 and 362 can be delayed with a 2-m fiber corresponding to the optical delay fiber 642 in order to decorrelate the signal. The frequency difference between the data channels and the CW laser generate by the beam source 212 can be tuned from 0.28 THz to 0.33 THz. The optical power can be subsequently split and mixed in 2 PIN-PDs to generate THz data channels with TE polarization. One of the THz transmitter can be mechanically rotated by 90° to generate orthogonal TM polarization, whose data can be been decorrelated by another 2-m fiber which precede the PIN-PD of the TM transmitter. The THz FDM data channels on different polarizations can then be multiplexed using a THz PBC.

For OAM multiplexing, the FDM and PDM channels can be split to two paths. In each path, the OAM modes can generated by using HDPE spiral phase plates with (ℓ =+1/+ 3. For example, data channels with OAM +1 are delayed ~1 m in the free space to decorrelate the data. The THz FDM, PDM and OAM-multiplexed beam is then transmitted over a 0.3-m distance. At the receiver circuit 500, the multiplexed beam can be demultiplexed by using another spiral phase plate with an inverse OAM order (ℓ =−1/−3). After the mode-demultiplexing, FDM channels on one of the polarizations are collected by the polarization-selective THz receiver. Both the FDM channels can be subsequently amplified by a THz amplifier and down-converted to 16-GHz intermedia frequency (IF) band by beating with a frequency multiplied radio frequency (RF) signal from the electrical LO in a THz electrical down converter. The IF signal can be sampled by a digital oscilloscope and demodulated by offline postprocessing.

FIG. 8 illustrates a method of transmitting a multiplexed communication by optical beam transformation, in accordance with present implementations. At least one of the example system 100 and the circuits 200-400, 600 and 700 can perform method 800 according to present implementations. The method 800 can begin at 810.

At 810, the method can generate a first beam with a first frequency. 810 can include 812. For example, the optical frequency range can include one or more frequencies corresponding to one or more of visible light, ultraviolet energy, and infrared energy. At 812, the method can generate a first beam in an optical frequency range. The method 800 can then continue to 820.

At 820, the method can generate a second beam with a second frequency. For example, the method can include generating the second beam by modulating the second beam to include the data. For example, the second frequency can satisfy a predetermined frequency threshold corresponding to the first frequency. 820 can include at least one of 822 and 824. At 822, the method can generate a second beam in an optical frequency range. At 824, the method can generate a second beam including data. The method 800 can then continue to 830.

At 830, the method can convert a first beam and a second beam into a third beam. For example, the method can include converting, by a photodiode, the first beam and the second beam into the third beam. 830 can include at least one of 832 and 834. At 832, the method can convert a first beam and a second beam into a third beam having a third frequency. At 834, the method can convert a first beam and a second beam into a third beam having a third frequency based on a difference between the first and second frequencies. For example, the difference between the first frequency and the second frequency can satisfy a predetermined frequency threshold. The method 800 can then continue to 840.

At 840, the method can transform a third beam into a fourth beam and a fifth beam. For example, the method can include transforming, by a spiral phase plate, the third beam into the fourth beam and the fifth beam. For example, the method can include aligning the fourth beam and the fifth beam concentrically based on a first center of the first circular cross-section and a second center of the second circular cross section. For example, the method can include transmitting the aligned fourth beam and the fifth beam. 840 can include at least one of 842, 844 and 846. At 842, the method can transform a third beam into a fourth beam having a first angular distribution. At 844, the method can transform a third beam into a fifth beam having a second angular distribution. For example, the first angular distribution can have a first circular cross section, and the second angular distribution can have a second circular cross section corresponding to the first circular cross section. At 846, the method can transform a third beam into a fourth beam having a first portion of data and a fifth beam having a second portion of the data. For example, the fourth beam can include the first portion of the data corresponding to a first channel of the data, and the fifth beam can include the second portion of the data corresponding to a second channel of the data.

Figure 9:
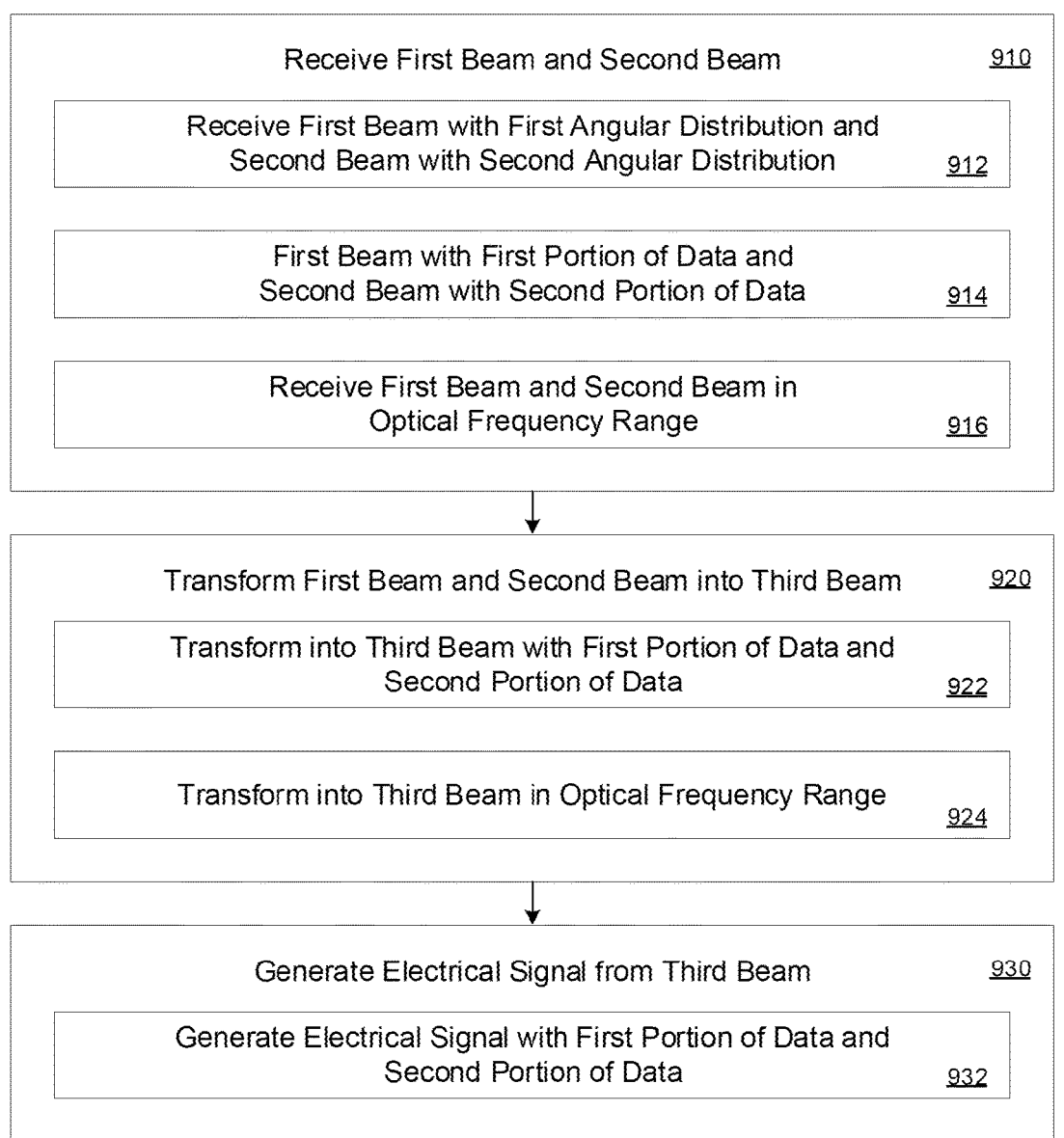
FIG. 9 illustrates a method of receiving a multiplexed communication by optical beam transformation, in accordance with present implementations.

FIG. 9 illustrates a method of receiving a multiplexed communication by optical beam transformation, in accordance with present implementations. At least one of the example system 100 and the circuit 500 can perform method 900 according to present implementations. The method 900 can begin at 910.

At 910, the method can receive a first beam and a second beam. For example, the first beam can have a first frequency in the optical frequency range can satisfy a predetermined frequency threshold corresponding to a second frequency in the optical frequency range of the second beam. For example, the difference between the first frequency and the second frequency can satisfy a predetermined frequency threshold. For example, the method can include receiving the first beam and the second beam aligned concentrically based on a first center of the first circular cross-section and a second center of the second circular cross section. 910 can include at least one of 912, 914 and 916.

At 912, the method can receive a first beam with a first angular distribution and a second beam with a second angular distribution. For example, the first angular distribution can have a first circular cross section, and the second angular distribution can have a second circular cross section corresponding to the first circular cross section. At 914, the method can receive a first beam with a first portion of data and a second beam with a second portion of the data. For example, the first beam can include the first portion of the data corresponding to a first channel of the data, and the second beam can include the second portion of the data corresponding to a second channel of the data. At 916, the method can a first beam and a second beam in an optical frequency range. For example, the optical frequency range can include one or more frequencies corresponding to one or more of visible light, ultraviolet energy, and infrared energy. The method 900 can then continue to 920.

At 920, the method can transform a first beam and a second beam into a third beam. 920 can include at least one of 922 and 924. At 922, the method can transform a first beam and a second beam into a third beam with a first portion of data and a second portion of the data. At 924, the method can transform a first beam and a second beam into a third beam in an optical frequency range. The method 900 can then continue to 930. At 930, the method can generate an electrical signal based on the third beam. 930 can include 932. At 932, the method can generate an electrical signal based on the third beam and including the first portion of the data and the second portion of the data.

Figure 10:
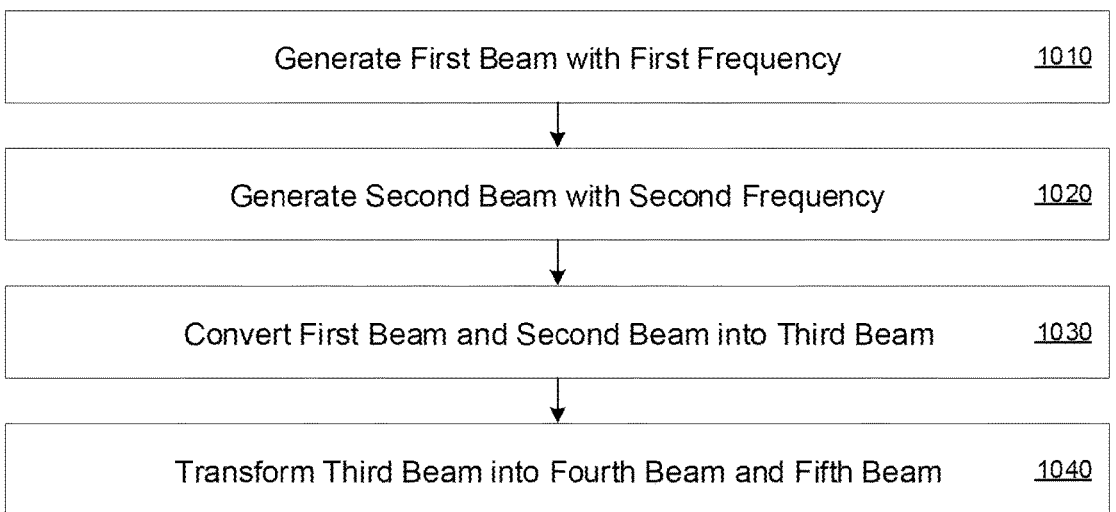
FIG. 10 illustrates a further method of transmitting a multiplexed communication by optical beam transformation in accordance with present implementations.

FIG. 10 illustrates a further method of transmitting a multiplexed communication by optical beam transformation in accordance with present implementations. At least one of the example system 100 and the circuits 200-400, 600 and 700 can perform method 1000 according to present implementations. The method 1000 can begin at 1010. At 1010, the method can generate a first beam with a first frequency. 1010 can correspond at least partially to 810. The method 1000 can then continue to 1020. At 1020, the method can generate a second beam with a second frequency. 1020 can correspond at least partially to 820. The method 1000 can then continue to 1030. At 1030, the method can convert a first beam and a second beam into a third beam. 1030 can correspond at least partially to 830. The method 1000 can then continue to 1040. At 1040, the method can transform a third beam into a fourth beam and a fifth beam. 1040 can correspond at least partially to 840.

Figure 11:
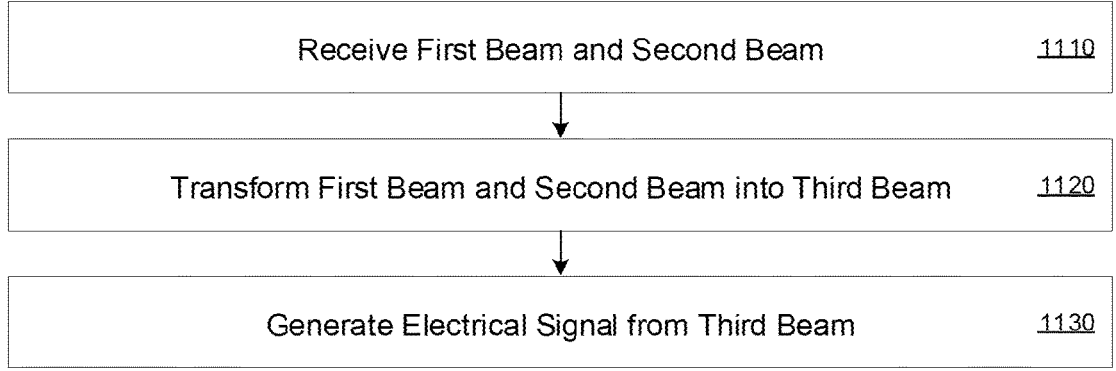
FIG. 11 illustrates a further method of receiving a multiplexed communication by optical beam transformation in accordance with present implementations.

FIG. 11 illustrates a further method of receiving a multiplexed communication by optical beam transformation in accordance with present implementations. At least one of the example system 100 and the circuit 500 can perform method 1100 according to present implementations. The method 1100 can begin at 1110. At 1110, the method can receive a first beam and a second beam. 1110 can correspond at least partially to 910. The method 1100 can then continue to 1120. At 1120, the method can transform a first beam and a second beam into a third beam. 1120 can correspond at least partially to 920. The method 1100 can then continue to 1130. At 1130, the method can generate an electrical signal based on the third beam. 1130 can correspond at least partially to 930.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system of transmission supporting multiplexed communication by optical beam transformation, the system comprising:
   a first beam generator to generate a first beam having a first frequency in an optical frequency range;
   a second beam generator to generate a second beam having a second frequency in the optical frequency range;
   a beam modulator operatively coupled with the second beam generator to modulate the second beam to include data;
   an optical fiber operatively coupled with the first beam generator and the beam modulator to convert the first beam and the second beam into a third beam including the data and having a third frequency based on a difference between the first frequency and the second frequency; and
   a phase transformer operatively coupled with a photodiode to transform the third beam into a fourth beam having a first angular distribution and including a first portion of the data, and into a fifth beam having a second angular distribution corresponding to the first angular distribution and including a second portion of the data.

2. The system of claim 1, the phase transformer comprising:
   a first spiral phase plate to transform the third beam into the fourth beam; and
   a second spiral phase plate to transform the third beam into the fifth beam.

3. The system of claim 1, the optical fiber comprising:
   a first fiber channel having a first length to transmit a portion of the third beam corresponding to the first beam at a first delay; and
   a second fiber channel having a second length to transmit a portion of the third beam corresponding to the second beam at a second delay greater than the first delay.

4. The system of claim 1, the second frequency satisfying a predetermined frequency threshold corresponding to the first frequency.

5. The system of any of claim 1, the difference between the first frequency and the second frequency satisfying a predetermined frequency threshold.

6. The system of claim 1, the optical frequency range including one or more frequencies corresponding to one or more of visible light, ultraviolet energy, and infrared energy.

7. The system of claim 1, further comprising:
   a photodiode operatively coupled with the optical fiber to convert the first beam and the second beam into the third beam.

8. The system of claim 1, the fourth beam including the first portion of the data corresponding to a first channel of the data, and the fifth beam including the second portion of the data corresponding to a second channel of the data.

9. The system of claim 1, the first angular distribution having a first circular cross section, and the second angular distribution having a second circular cross section corresponding to the first circular cross section.

10. The system of claim 9, the phase transformer to align the fourth beam and the fifth beam concentrically based on a first center of the first circular cross section and a second center of the second circular cross section.

11. The system of claim 10, further comprising:
   a transmitter operatively coupled with the phase transformer to transmit the aligned fourth beam and the fifth beam.

12. A method of transmission supporting multiplexed communication by optical beam transformation, the method comprising:
   generating a first beam having a first frequency in an optical frequency range;
   generating a second beam including data and having a second frequency in the optical frequency range;
   converting the first beam and the second beam into a third beam including the data and having a third frequency based on a difference between the first frequency and the second frequency; and
   transforming the third beam into a fourth beam having a first angular distribution and including a first portion of the data, and into a fifth beam having a second angular distribution corresponding to the first angular distribution and including a second portion of the data.

13. The method of claim 12, further comprising:
   generating the second beam by modulating the second beam to include the data.

14. The method of any of claim 12, the difference between the first frequency and the second frequency satisfies a predetermined frequency threshold.

15. The method of claim 12, further comprising:
converting, by a photodiode, the first beam and the second beam into the third beam.

16. The method of claim 12, further comprising:
transforming, by a spiral phase plate, the third beam into the fourth beam and the fifth beam.

17. The method of claim 12, the fourth beam including the first portion of the data corresponding to a first channel of the data, and the fifth beam including the second portion of the data corresponding to a second channel of the data.

18. The method of claim 12, further comprising:
aligning the fourth beam and the fifth beam concentrically based on a first center of a first circular cross-section of the first angular distribution, and based on a second center of a second circular cross section corresponding to the first circular cross section; and
transmitting the aligned fourth beam and the fifth beam.

19. A system of transmission supporting multiplexed communication by optical beam transformation, the system comprising:
a transmitter system comprising:
a first beam generator to generate a first beam having a first frequency in an optical frequency range;
a second beam generator to generate a second beam having a second frequency in the optical frequency range;

a beam modulator operatively coupled with the second beam generator to modulate the second beam to include data;
an optical fiber operatively coupled with the first beam generator and the beam modulator to convert the first beam and the second beam into a third beam including the data and having a third frequency based on a difference between the first frequency and the second frequency; and
a phase transformer operatively coupled with a photodiode to transform the third beam into a fourth beam having a first angular distribution and including a first portion of the data, and into a fifth beam having a second angular distribution corresponding to the first angular distribution and including a second portion of the data; and
a receiver system comprising:
a second phase transformer to receive the fourth beam and the fifth beam;
an optical signal converter to transform the fourth beam and the fifth beam into a sixth beam in the optical frequency range including the first portion and the second portion of the data; and
a digital signal processor to generate, based on the sixth beam, a first electrical signal including the first portion and the second portion of the data.

20. The system of claim 19, the optical signal converter comprising:
a first spiral phase plate to transform the fourth beam and the fifth beam into the sixth beam.

* * * * *